US005508086A

United States Patent [19]

Kasahara

[11] Patent Number: 5,508,086

[45] Date of Patent: Apr. 16, 1996

[54] ELECTROSTATIC NOTICE BOARD SYSTEM

[75] Inventor: Keiji Kasahara, Kakegawa, Japan

[73] Assignee: Abisare, Co., Ltd., Japan

[21] Appl. No.: 91,556

[22] Filed: Jul. 14, 1993

[30] Foreign Application Priority Data

Jul. 29, 1992 [JP] Japan .................................... 4-202503

[51] Int. Cl.[6] .................................................. B32B 3/00

[52] U.S. Cl. .......................... 428/195; 428/207; 428/323; 428/411.1; 428/458; 428/460; 428/461; 428/688; 428/913

[58] Field of Search .................................... 428/195, 913, 428/206, 207, 212, 328, 329, 330, 458, 460, 461, 688, 689, 690, 323, 411.1; 361/234, 233; 296/21; 40/593

[56] References Cited

U.S. PATENT DOCUMENTS

| | | | |
|---|---|---|---|
| 3,359,469 | 12/1967 | Levy et al. | 317/262 |
| 3,448,356 | 6/1969 | Testone | 317/262 |
| 3,480,364 | 11/1969 | Barnett | 361/233 X |
| 3,634,740 | 1/1972 | Stevko | 317/262 |
| 3,916,270 | 10/1975 | Wachtler et al. | 317/262 |
| 4,480,284 | 10/1984 | Tojo et al. | 361/234 |
| 4,766,515 | 8/1988 | Bollen et al. | 361/234 |
| 4,861,665 | 8/1989 | Kasahara | 428/411.1 |
| 4,975,802 | 12/1990 | Kasahara | 361/233 |
| 5,173,834 | 12/1992 | Sogoh | 361/234 |
| 5,229,910 | 7/1993 | Kasahara | 361/234 |
| 5,260,849 | 11/1993 | Kasahara | 361/234 |

FOREIGN PATENT DOCUMENTS

| | | | |
|---|---|---|---|
| 0249717A1 | 4/1987 | Germany . | |
| 61-152497 | 7/1986 | Japan . | |
| 2-304946 | 12/1990 | Japan | 279/128 |
| 3-227554 | 10/1991 | Japan | 279/128 |

*Primary Examiner*—Patrick J. Ryan
*Assistant Examiner*—William A. Krynski
*Attorney, Agent, or Firm*—Senniger, Powers, Leavitt & Roedel

[57] ABSTRACT

An electrostatic notice board system in which characters can be written on the surface while attraction force sufficient to hold objects thereon being maintained. In the system, a hard coating material layer is formed at the surface off the attraction layer consisting of a layered dielectric substance and the back face of the attraction layer is provided with a pair of positive and negative electrodes in the form of comb-teeth, so that the objects such as paper sheets are attracted and held by coulomb force on the surface of the hard coating material layer. The hard coating material layer is, for example, formed by applying acrylic urethane coating material to the surface of the attraction layer and hardening the material with ultraviolet ray irradiation. The hard coating material layer has a volume resistivity of $10^{10}$ Ω cm or more and thickness of 50 μ or less.

21 Claims, 4 Drawing Sheets

ELECTROSTATIC NOTICE BOARD SYSTEM

BACKGROUND OF THE INVENTION (1) Field of the Invention

The present invention relates to an electrostatic notice board system for attracting objects by coulomb force so as to be held thereon, and more particularly, an electrostatic notice board system arranged such that characters can be written on its posting-up surface on which sheet-like notices are to be attracted and held for the purpose of advertisement, providing information or the like.

(2) Description of the Prior Art

One known electrostatic notice board system for attracting objects such as sheets by coulomb force so as to be held thereon comprises an attraction layer consisting of a layered dielectric substance and a pair of electrodes electrically separated from each other and formed in a laminate structure on the back face side of the attraction layer. In this conventional electrostatic notice board system, the pair of electrodes are connected to a d.c. power source, thereby utilizing coulomb force to attract and hold an object on the surface of the attraction layer.

SUMMARY OF THE INVENTION

If such an electrostatic notice board system is not only provided with the primary function, that is, attracting and holding of e.g., sheet-like objects on its posting-up surface, but also characters can be written, in a similar manner to the case of whiteboard, on the posting-up surface with a writing unit such as a marker, the system becomes very useful and will be extensively used in various occasions. It is conceivable that for providing an electrostatic notice board system with both posting-up function and whiteboard-like function, another layer on which characters can be written may be disposed on the surface of the attraction layer. The provision of another surface layer simply disposed on the attraction layer, however, has proven to have the problem that the interior of the surface layer becomes electrically conductive when the electrodes are connected to a power source so that an electric field for causing polarization charge necessary for attraction and holding of an object cannot be satisfactorily generated or the "electret" phenomenon occurs on the surface layer, resulting in a loss of attraction force.

In order to overcome the above problem, a principle object of the invention is to provide an electrostatic notice board system wherein characters can be written on its posting-up surface whilst coulomb force sufficient for attracting and holding an object being maintained on the same surface.

With the foregoing object in view, there is provided an electrostatic notice board system according to the invention comprising:

(a) an attraction layer consisting of a layered dielectric substance;

(b) a hard coating material layer having a volume resistivity of $10^{10}$ Ω cm or more and a specified surface hardness, the hard coating material layer being formed at one face side of the attraction layer; and (c) at least a pair of electrodes formed on the other face side of the attraction layer such that the electrodes are electrically separated from each other in a laminate structure for generating an electric field in order to cause polarization charge at the attraction layer, wherein an object placed on the face side of the attraction layer with the hard coating material layer interposed therebetween can be attracted and held by means of coulomb force.

The hard coating material layer may be formed by applying acrylic urethane resin or polyester resin to one face of the attraction layer and hardening the resin by means of ultraviolet ray irradiation. Alternatively, it may be formed by applying methacrylic resin to one face of the attraction layer and hardening the resin utilizing heat reaction. Another alternative is such that acrylic resin or urethane resin is applied to one face of the attraction layer and hardened. It is also possible to apply fluorine-contained enamel resin to one face of the attraction layer by baking. In these cases, the thickness of the hard coating material layer is most preferably 50 μ or less, and the hard coating material layer may be composed of one layer or more. The preferable surface hardness of the hard coating material layer is 3 H or more.

The attraction layer is made of a plastic material and is preferably made of a plastic material including one or more conductive materials selected from gold, silver, tin, zinc oxide, conductive oxides, conductive ionic resins and carbon black, the conductive material(s) being made into minute pieces and dispersed in the plastic material. In this case, the volume resistivity of the attraction layer is preferably set in the range of $10^{11}$ to $10^{14}$ Ω cm.

Preferably, an insulating layer is formed at one face side of the pair of electrodes, the face side being opposite to the face adjacent to the attraction layer. In this case, the insulating layer is made of an insulating adhesive and has a volume resistivity of $10^{14}$ Ω cm or more.

According to such an electrostatic notice board system as described above, there is a hard coating material layer having a volume resistivity of $10^{10}$ Ω cm and a specified surface hardness disposed on one face side of an attraction layer so that an electric field generated by applying d.c. voltage across a pair of electrodes macroscopically causes polarization charge throughout the attraction layer and hard coating material layer. With this arrangement, not only can attraction force sufficient for holding objects be ensured, but also characters can be written on the surface of the hard coating material layer.

In this case, the thickness of the hard coating material layer is set to 50 μ or less and the hard coating material layer is formed by applying acrylic urethane resin to one face of the attraction layer by means of painting, coating, screen printing or a similar method and hardening the resin by ultraviolet ray irradiation, whereby a coated film having a desired resistivity, high hardness and excellent abrasion resistance can be achieved.

Other objects of the present invention will become apparent from the detailed description given hereinafter. However, it should be understood that the detailed description and specific examples, while indicating a preferred embodiment of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is an exploded perspective view;

FIG. 2 is a partial plan view;

FIG. 3 is a partly diagrammatic sectional view; and

FIG. 4 is a perspective view of the electrostatic notice board system in use.

DESCRIPTION OF THE PREFERRED EMBODIMENT

Figure 1:
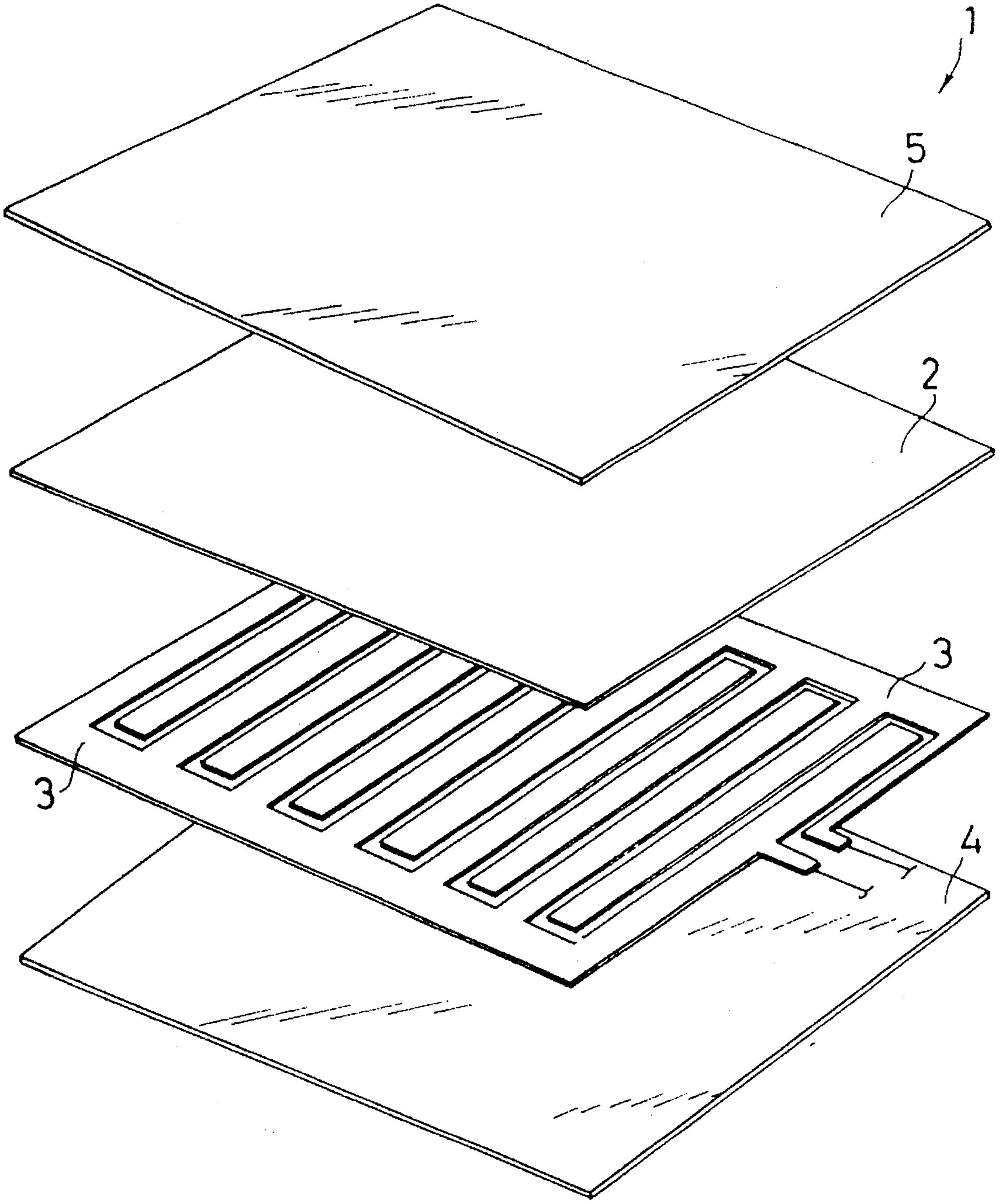
FIGS. 1 through 4 are for illustrating one embodiment of an electrostatic notice board system according to the invention.

Referring now to the drawings, one embodiment of an electrostatic notice board system according to the invention will be explained.

Figure 2:
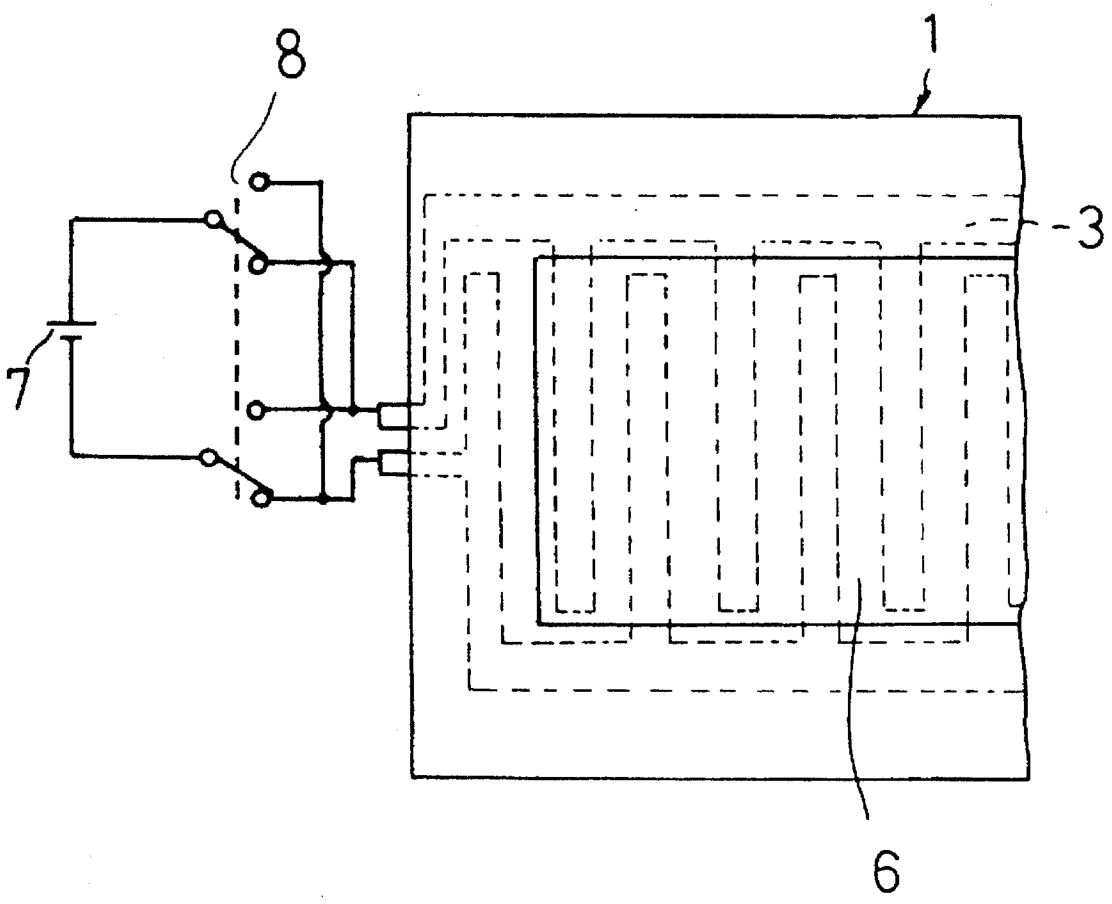
Figure 3:
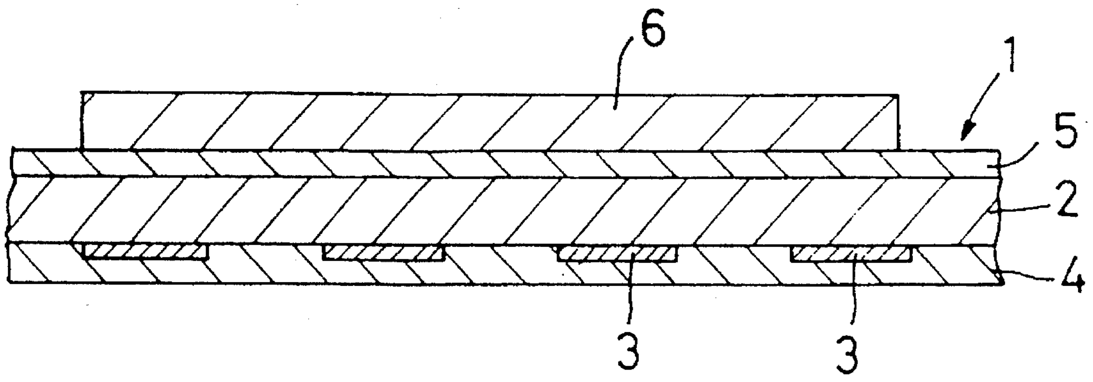
Figure 4:
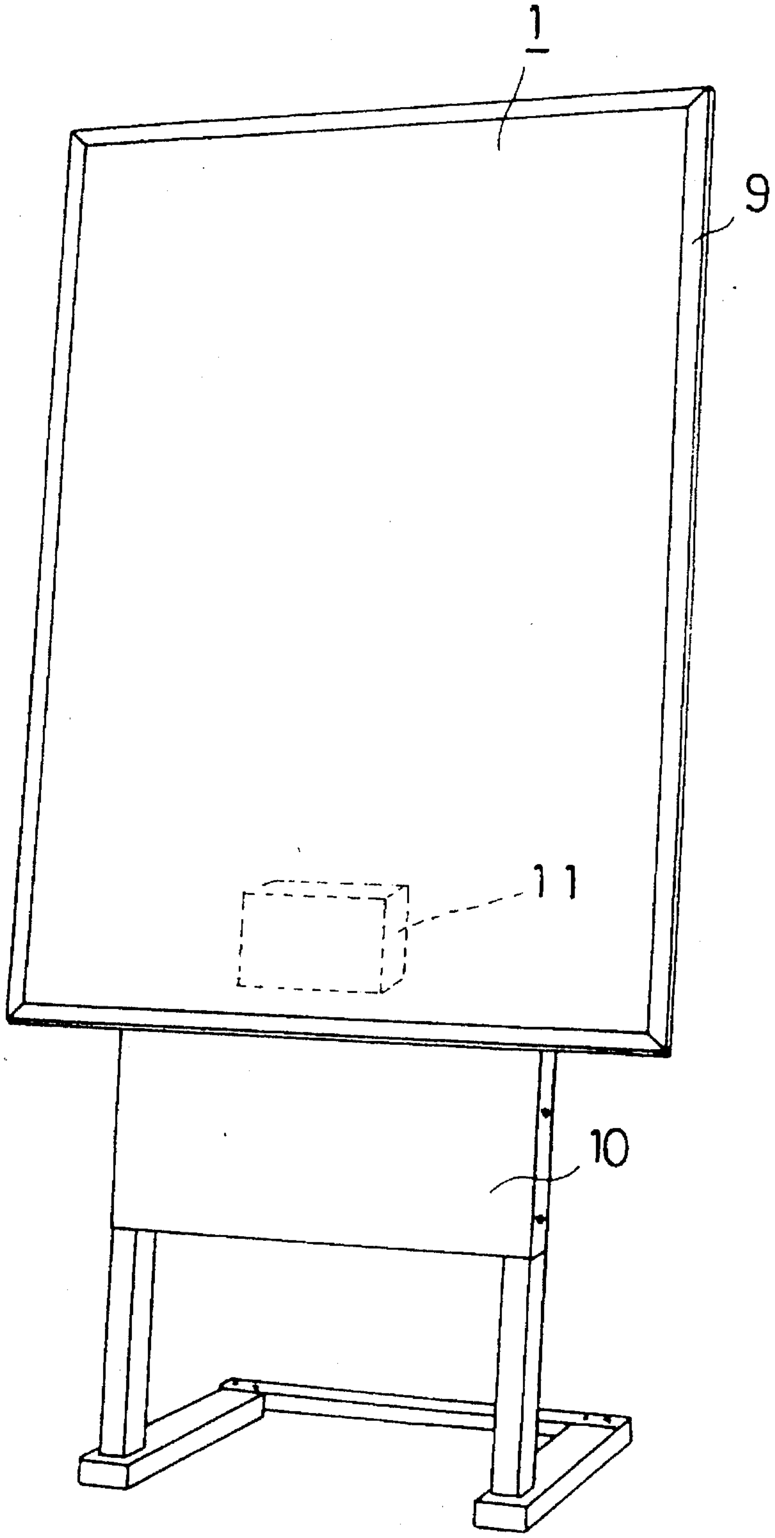

FIG. 1 shows an exploded perspective view of an electrostatic notice board system according to one embodiment of the invention. FIGS. 2 and 3 show a partial plan view, and partly diagrammatic sectional view of the electrostatic notice board system respectively, and FIG. 4 shows a perspective view of one example of the system in use.

An electrostatic notice board system 1 according to the embodiment comprises an attraction layer 2, a pair of comb-teeth like electrodes 3 consisting of positive and negative electrodes formed in a laminate structure on the back face side of the attraction layer 2, and an insulating adhesive layer 4 disposed on one face side of the comb-teeth like electrodes 3, the face side being opposite to the face adjacent to the attraction layer 2. Disposed on the front face of the attraction layer 2 is a hard coating material layer 5 consisting of a single layer, and an object 6 such as a paper sheet is held and attracted by coulomb force at the front face side of the attraction layer 2, with the hard coating material layer between.

The attraction layer 2 is made of a plastic material and is preferably made of a plastic material containing minute pieces of conductive material(s) dispersed therein. The above plastic material is among polyester, polyvinyl chloride, acrylic, polycarbonate, polyacetal, phenol and epoxy. The dispersed conductive material(s) is one or more materials selected from gold, silver, tin, zinc oxide, conductive oxides and conductive ionic resins. The attraction layer 2 has a thickness of 0.5 to 0.1 mm and a volume resistivity of $10^{11}$ to $10^{14}$ Ω cm.

The pair of comb-teeth like electrodes 3 are formed such that oppositely directed teeth portions are alternately arranged in a mating manner as shown in FIGS. 1 and 2 and each terminal is connected to a d.c. power source 7 through a selector switch 8. When the selector switch 8 is operated, the polarity of the pair of comb-teeth like electrodes 3 is switched. The selector switch 8 is operated when the object 6 is held by attraction for a long time and this operation prevents the occurrence of the "electret" phenomenon which causes a decrease in the attraction force of the attraction layer 2 etc. The adhesive layer 4 is formed of a high-insulating material of which volume resistivity is $10^{14}$ Ω cm or more.

The hard coating material layer 5 is formed by applying acrylic urethane resin to the front face of the attraction layer 2 by means of painting, coating, screen printing or a similar method, and hardening the resin by ultraviolet ray irradiation. The electrostatic notice board system 1 having the above-described structure is fitted into a rectangular supporting frame 9 as shown in FIG. 4 with the adhesive layer 4 facing to the inside, and mounted together with the supporting frame 9 on a stand 10 when it is used. The electrostatic notice board system 1 may be fixed to or hung on a wall with the help of a mounting bracket or the like, instead of mounting it on the stand 10. The reference numeral 11 in FIG. 4 denotes a power unit that includes a power supply switch (not shown) and the selector switch 8.

In this embodiment, the volume resistivity of the hard coating material layer 5 disposed on the front face of the attraction layer 2 is $10^{10}$ Ω cm or more irrespective of the volume resistivity of the attraction layer 2, and more preferably falls within the range of $10^{10}$ to $10^{13}$ Ω cm. The thickness of the hard coating material layer 5 is 50 μ or less (10 g/$m^2$ or less). With the volume resistivity and thickness of the hard coating material layer 5 as specified above, an electric field generated by the application of voltage macroscopically causes sufficient polarization charge throughout the attraction layer 2 and the hard coating material layer 5 so that sufficient attraction force acts on the object 6. If the volume resistivity of the hard coating material layer 5 is less than $10^{10}$ Ω cm, the interior of the hard coating material layer becomes conductive at the time of supplying power, with the result that no polarization charge cannot be caused. On the other hand, if the volume resistivity exceeds $10^{13}$ Ω cm, the great "electret" phenomenon occurs at the hard coating material layer 5 so that satisfactory attraction force for the object 6 cannot be obtained. In such a case, the decrease of attraction force can be prevented by manipulating the selector switch 8 in order to make the electrostatic notice board system 1 satisfactorily operable.

According to the electrostatic notice board system 1 of the embodiment, since the surface of the attraction layer 2 is white or pale gray, it is possible to write characters etc. on the surface with a marker or the like used for a whiteboard and the characters etc. written on the surface can be clearly seen.

The use of UV-hardenable acrylic urethane resin as the hard coating material layer 5 makes it possible to use writing units having a hard writing tip. Since the system has a hardness of 3 H or more at the surface, the surface is resistant to and free from abrasion even when hard-type writing units are used so that high abrasion resistance and high durability can be achieved. In contrast with the above resin, when an epoxy coating material is hardened, the resistivity becomes too high. Soft type polyvinyl chloride exhibits appropriate resistivity but has a problem in the surface hardness whilst hard type polyvinyl chloride has an excessively high resistivity. It has been proven that the surface of the hard coating material layer 5 according to the embodiment has quality equivalent to that of the whiteboard (porcelain enameled whiteboard) stipulated by JIS S 6052 in terms of appearance, colour, the ability of holding marker ink, the removability of marker ink, and the roughness off the surface etc.

TABLE 1

| | Hard Coating Material | | | | | | | |
|---|---|---|---|---|---|---|---|---|
| Attraction | Embodiment 1 | | Comparative Example 1 | | Comparative Example 2 | | Comparative Example 3 | |
| Sheet | A | B | A | B | A | B | A | B |
| $10^{11}$ Ω cm (zinc oxide) | 6 | 6 | 1 | 5 | 0 * | 0 * | 5 | 5 |
| $10^{13}$ Ω cm (zinc oxide) | 3 * | 5 | 2 | 5 | 0 | 0 | 5 | 5 |
| $10^{14}$ Ω cm (zinc oxide) | 3 | 4 | 1 | 5 | 0 | 0 | 4 | 4 |

A: straight
B: switch
*: no residue

Table 1 shows, as an example, the result of a test for checking the relation between the volume resistivity of the hard coating material layers and attraction force. This test was conducted at a temperature of 23° C. and a humidity of 67% in such a way that: a high-quality paper sheet of 90 g in weight (A-4 size) was first placed on the surface of the hard coating material layer 5 as the object 6, and then a d.c. voltage of 2000 V was applied to the power source 7. 10 seconds after the voltage application, attraction force (kg) was measured by pulling the object 6 with a spring balance. In Table 1, the hard coating material used in the embodiment is an acrylic urethane hard coating material having a volume resistivity of $4.7\times10^{11}$ Ω cm and thickness of 50 μ. The hard coating material used in the comparative example 1 is a polyester hard coating material having a volume resistivity of $2.8\times10^{15}$ Ω cm and thickness of 50 μ. In the comparative example 2, a metal hard coating material (layer 5) such as aluminum, copper or stainless steel, whose thickness and volume resistivity were 20 μ and $10^{-4}$ Ω cm respectively, was applied by vapor deposition or spattering. In the comparative example 3, no hard coating material (layer 5) was used. In Table 1, "straight" indicates a case where the polarity of voltage applied to the electrodes was not changed whilst "switch" indicates a case where the polarity of the applied voltage was changed every specified hour. "No residue" means that when voltage application was stopped, electrostatic charge generated in a hard coating material layer has disappeared.

According to the test result, when the volume resistivity of a hard coating material was set to the order of $10^{11}$ Ω cm like the case of the embodiment, no big difference was found between the attraction force of the "straight" condition and that of the "switch" condition. On the other hand, when the volume resistivity was set to the order of $10^{15}$ Ω cm like the comparative example 1, it was found that the attraction force of the "straight" condition was smaller than that of the "switch" condition. This indicates there occurred the "electret" phenomenon in the hard coating material layer 5.

Although the invention has been particularly described with the hard coating material layer 5 of 50 μ or less in thickness in the foregoing embodiment, the thickness of the hard coating material layer 5 is not necessarily limited to this and could be appropriately set in accordance with the thickness of the attraction layer 2.

Although the attraction layer 2 of the above embodiment is formed such that minute metal pieces or minute pieces of conductive material(s) such as zinc oxide are dispersed in a plastic material such as polyvinyl chloride, it is also possible to form the attraction layer 2 such that carbon black is dispersed in a resin. In the case of carbon black, the electrostatic notice board system assumes a black colour as a whole and therefore specified writing units with ink of white hues should be used for writing on it.

Further, the hard coating material layer 5 need not be formed by hardening acrylic urethane resin applied to the surface of the attraction layer by means of ultraviolet ray irradiation. The hard coating material layer 5 could be obtained by other methods such as, for example, (i) hardening polyester resin with ultraviolet ray irradiation; (ii) coating the attraction layer with methacrylic resin of several microns in thickness and hardening the resin utilizing heat reaction; (iii) hardening acrylic resin or urethane resin by heat or at ordinary temperature; (iv) applying fluorine-contained enamel resin by baking. Any one of the above methods should be selected taking the following factors into consideration: (i) drying temperature that does not affect the plastic base material of the attraction layer; (ii) adhesive properties with respect to the plastic base material; (iii) cracking resistance coping with the flexibility of the plastic material; and (iv) chemical resistance and contamination resistance to the ink of a marker, achieved after a coating material has been applied.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electrostatic notice board system for use with a power source comprising:

(a) a dielectric attraction layer:

(b) a hard coating material layer having a volume resistivity of $10^{10}$ Ωcm or more and having a hardness of at least 3 H, the hard coating material layer on one face side of the attraction layer; and (c) at least a pair of electrodes on the other face side of the attraction layer such that the electrodes are electrically separated from each other, said electrodes adapted to be connected to the power source for generating an electric field in order to cause a polarization charge at the attraction layer;

wherein said attraction layer, said hard coating material layer and said electrodes form a laminate structure; and wherein an object placed on the one face side of the attraction layer with the hard coating material layer interposed between the object and the attraction layer can be attracted and held by means of a coulomb force resulting from the electric field.

2. The electrostatic notice board system as claimed in claim 1, wherein the volume resistivity of the attraction layer is within the range of $10^{11}$ to $10^{14}$ Ω cm.

3. The electrostatic notice board system as claimed in claim 1, wherein the attraction layer is made of a plastic material.

4. The electrostatic notice board system as claimed in claim 3, wherein the plastic material contains minute pieces of conductive material dispersed therein.

5. The electrostatic notice board system as claimed in claim 4, wherein the conductive material is one or more materials selected from gold, silver, tin, zinc oxide, conductive oxides and conductive ionic resins.

6. The electrostatic notice board system as claimed in claim 4, wherein the conductive material is carbon black.

7. The electrostatic notice board system as claimed in claim 1, wherein the hard coating material layer is composed of one layer or more.

8. The electrostatic notice board system as claimed in claim 7, wherein the hard coating material layer has a surface hardness of 3 H or more.

9. The electrostatic notice board system as claimed in claim 7, wherein the hard coating material layer is formed by applying acrylic urethane resin to the surface of the attraction layer and hardening the resin by means of ultraviolet ray irradiation.

10. The electrostatic notice board system as claimed in claim 7, wherein the hard coating material layer is formed by applying polyester resin to the surface of the attraction layer and hardening the resin by means of ultraviolet ray irradiation.

11. The electrostatic notice board system as claimed in claim 1, wherein the hard coating material layer is formed by applying methacrylic resin to the surface of the attraction layer and hardening the resin utilizing heat reaction.

12. The electrostatic notice board system as claimed in claim 7, wherein the hard coating material layer is formed by applying acrylic resin to the surface of the attraction layer and hardening the resin.

13. The electrostatic notice board system as claimed in claim 7, wherein the hard coating material layer is formed by applying urethane resin to the surface of the attraction layer and hardening the resin.

14. The electrostatic notice board system as claimed in claim 7, wherein the hard coating material layer is formed by applying fluorine-contained enamel resin to the surface of the attraction layer by baking.

15. The electrostatic notice board system as claimed in claim 1, wherein the hard coating material layer has a thickness of 50 μ or less.

16. The electrostatic notice board system as claimed in claim 1, wherein an insulating layer is disposed at one face side of the pair of electrodes, the one face side being opposite to the face of the electrodes which is on the other face side of the attraction layer.

17. The electrostatic notice board system as claimed in claim 16, wherein the insulating layer is formed of an insulating adhesive.

18. The electrostatic notice board system as claimed in claim 16, wherein the insulating layer has a volume resistivity of $10^{14}$ Ω cm or more.

19. The electrostatic notice board system as claimed in claim 17, wherein the insulating layer has a volume resistivity of $10^{14}$ Ω cm or more.

20. The electrostatic notice board system as claimed in claim 1 wherein the attraction layer comprises a plastic material including one or more conductive materials selected from gold, silver, tin, zinc oxide, conductive oxides, conductive ionic resins and carbon black, the conductive material being minute pieces disbursed in the plastic material, and wherein the volume resistivity of the attraction layer is within the range of $10^{11}$ to $10^{14}$ Ω cm.

21. The electrostatic notice board system as claimed in claim 1 wherein the attraction layer comprises a plastic material having a thickness of 0.5 to 0.1 mm and a volume resistivity of $10^{11}$ to $10^{14}$ Ω cm.

* * * * *